United States Patent
Park et al.

(10) Patent No.: US 12,484,793 B2
(45) Date of Patent: Dec. 2, 2025

(54) APPARATUS AND METHOD FOR ESTIMATING BLOOD PRESSURE

(71) Applicant: SAMSUNG ELECTRONICS CO., LTD., Suwon-si (KR)

(72) Inventors: Chang Soon Park, Chungju-si (KR); Ui Kun Kwon, Hwaseong-si (KR); Young Soo Kim, Seoul (KR); Dae Geun Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 755 days.

(21) Appl. No.: 17/839,688

(22) Filed: Jun. 14, 2022

(65) Prior Publication Data

US 2023/0190117 A1    Jun. 22, 2023

(30) Foreign Application Priority Data

Dec. 20, 2021    (KR) .................. 10-2021-0183190

(51) Int. Cl.
*A61B 5/021* (2006.01)
*A61B 5/00* (2006.01)
*A61B 5/026* (2006.01)

(52) U.S. Cl.
CPC ...... *A61B 5/02116* (2013.01); *A61B 5/02125* (2013.01); *A61B 5/0261* (2013.01); *A61B 5/681* (2013.01)

(58) Field of Classification Search
CPC ............ A61B 5/02116; A61B 5/02125; A61B 5/0261; A61B 5/681
See application file for complete search history.

(56) References Cited

U.S. PATENT DOCUMENTS

| 5,309,908 A | 5/1994 | Friedman et al. |
| 8,755,857 B2 | 6/2014 | Melker et al. |

(Continued)

FOREIGN PATENT DOCUMENTS

| KR | 10-0997444 B1 | 11/2010 |
| KR | 10-1503604 B1 | 3/2015 |

(Continued)

OTHER PUBLICATIONS

Baruch, Martin C et al., "Validation of the pulse decomposition analysis algorithm using central arterial blood pressure", BioMedical Engineering OnLine, 2014, http://www.biomedical-engineering-online.com/content/13/1/96. (19 pages total).

(Continued)

*Primary Examiner* — Devin B Henson
*Assistant Examiner* — Erin Kathleen Mccormack
(74) *Attorney, Agent, or Firm* — Sughrue Mion, PLLC

(57) ABSTRACT

An apparatus for estimating blood pressure may include a sensor configured to measure a bio-signal from an object; and a processor configured to: obtain a cardiac output (CO) feature based on the bio-signal; obtain a total peripheral resistance (TPR) feature by combining an amplitude of a propagation wave component and amplitudes of at least two reflection wave components of the bio-signal, in response to a variation of the CO feature at a blood pressure measurement time relative to a calibration time, being within a predetermined range; obtain the TPR feature by combining the amplitude of the propagation wave component and an amplitude of one reflection wave component of the at least two reflection wave components, in response to the variation of the CO feature not being within the predetermined range; and estimate blood pressure based on the CO feature and the TPR feature.

20 Claims, 13 Drawing Sheets

(56) References Cited

U.S. PATENT DOCUMENTS

| | | |
|---|---|---|
| 10,488,936 B2 | 11/2019 | Baranski et al. |
| 10,576,285 B2 | 3/2020 | Annoni et al. |
| 10,820,858 B2 | 11/2020 | Yoon et al. |
| 10,993,627 B1* | 5/2021 | Dotter ............... A61B 5/02125 |
| 11,241,197 B2 | 2/2022 | Kang et al. |
| 11,426,130 B2 | 8/2022 | Jang et al. |
| 2012/0203080 A1 | 8/2012 | Kim et al. |
| 2016/0270668 A1 | 9/2016 | Gil |
| 2017/0049340 A1 | 2/2017 | Cho et al. |
| 2018/0177466 A1 | 6/2018 | Park et al. |
| 2019/0000331 A1 | 1/2019 | Han |
| 2019/0059753 A1* | 2/2019 | Chen ................ A61B 5/0245 |
| 2019/0099090 A1* | 4/2019 | Cho ................ A61B 5/02125 |
| 2019/0110698 A1* | 4/2019 | Ko ......................... G16H 40/63 |
| 2020/0054290 A1 | 2/2020 | Jang et al. |
| 2020/0107789 A1* | 4/2020 | Kwon ................ A61B 5/7278 |
| 2020/0196880 A1 | 6/2020 | Kwon et al. |
| 2021/0007615 A1 | 1/2021 | Jang et al. |
| 2021/0085246 A1 | 3/2021 | Yoon et al. |
| 2021/0085259 A1 | 3/2021 | Kwon et al. |
| 2021/0282648 A1 | 9/2021 | Park et al. |
| 2022/0008020 A1 | 1/2022 | Park et al. |
| 2024/0016401 A1* | 1/2024 | Khurana .............. A61B 5/0261 |

FOREIGN PATENT DOCUMENTS

| | | |
|---|---|---|
| KR | 10-2015-0102592 A | 9/2015 |
| KR | 10-2017-0056324 A | 5/2017 |
| KR | 10-2018-0040400 A | 4/2018 |
| KR | 10-2019-0043464 A | 4/2019 |
| KR | 10-2020-0021208 A | 2/2020 |
| KR | 10-2020-0077932 A | 7/2020 |
| KR | 10-2021-0007368 A | 1/2021 |
| KR | 10-2021-0033789 A | 3/2021 |
| KR | 10-2021-0114228 A | 9/2021 |

OTHER PUBLICATIONS

Extended European Search Report issued by European Patent Office on Apr. 5, 2023 for European Patent Application No. 22205798.6.
Communication issued on Sep. 21, 2023 by the Korean Intellectual Property Office for Korean Patent Application No. 10-2021-0183190.

* cited by examiner

APPARATUS AND METHOD FOR ESTIMATING BLOOD PRESSURE

CROSS-REFERENCE TO RELATED APPLICATION(S)

This application claims the benefit under 35 USC § 119(a) of Korean Patent Application No. 10-2021-0183190, filed on Dec. 20, 2021, in the Korean Intellectual Property Office, the entire disclosure of which is incorporated herein by reference for all purposes.

BACKGROUND

1. Field

One or more example embodiments relate to estimating blood pressure based on features extracted from a pulse wave signal.

2. Description of Related Art

With the aging population, increased medical costs, and a lack of medical personnel for specialized medical services, research is being conducted on information technology (IT)-medical convergence technologies, in which IT technology and medical technology are combined. Particularly, monitoring of a health condition of a human body may not be limited to places such as hospitals, but is expanded by mobile healthcare fields that may monitor a user's health condition anywhere (e.g., at home or office on in transit from one place to another place) and anytime in daily life. Some examples of bio-signals, which indicate the health condition of individuals, may include an electrocardiography (ECG) signal, a photoplethysmogram (PPG) signal, an electromyography (EMG) signal, and the like, and various bio-signal sensors are being developed to measure the bio-signals in daily life. For example, the PPG sensor may estimate blood pressure of a human body by analyzing a pulse waveform which reflects a condition of the cardiovascular system and the like.

A PPG signal is composed of a superposition of a propagation wave starting from the heart toward the body distal ends and reflection waves returning from the body distal ends. In addition, it is known that information used to estimate blood pressure can be obtained by extracting various features related to the propagation wave or the reflection waves.

SUMMARY

According to an aspect of the present disclosure, an apparatus for estimating blood pressure, may include: a sensor configured to measure a bio-signal from an object; and a processor configured to: obtain a cardiac output (CO) feature based on the bio-signal; obtain a total peripheral resistance (TPR) feature by combining an amplitude of a propagation wave component and amplitudes of at least two reflection wave components of the bio-signal, in response to a variation of the CO feature at a blood pressure measurement time relative to a calibration time, being within a predetermined range; obtain the TPR feature by combining the amplitude of the propagation wave component and an amplitude of one reflection wave component of the at least two reflection wave components, in response to the variation of the CO feature not being within the predetermined range; and estimate blood pressure based on the CO feature and the TPR feature.

The CO feature may include at least one of a heart rate or a ratio between an amplitude at a predetermined point of the bio-signal and an area under a waveform of the bio-signal.

The predetermined point may include a point at which a slope of the waveform of the bio-signal is closest to 0 in a systolic period.

The processor may be further configured to, in response to the variation of the CO feature being within the predetermined range: linearly combine an amplitude of a first reflection wave component and an amplitude of a second reflection wave component, among the at least two reflection wave components, to obtain a combination result; and obtain a ratio between the combination result and the amplitude of the propagation wave component as the TPR feature.

The processor may be further configured to: apply a predetermined weight to the second reflection wave component; and linearly combine the second reflection wave component with the first reflection wave component.

The predetermined weight may be a value less than 1.

The processor may be further configured to obtain, as the TPR feature, a ratio between the amplitude of the one reflection wave component and the amplitude of the propagation wave component, in response to the variation of the CO feature not being within the predetermined range.

The processor may be further configured to obtain the variation of the CO feature by dividing a value of the CO feature at the blood pressure measurement time by a value of a reference CO feature at the calibration time.

The processor may be further configured to, in response to the variation of the CO feature not being within the predetermined range: obtain a second-order differential signal of the bio-signal; extract a first point of the propagation wave component and a second point of the one reflection wave component by searching for a local minimum point of the second-order differential signal; and obtain the TPR feature by combining the amplitude of the propagation wave component at the first point and the amplitude of the one reflection wave component at the second point.

The processor may be further configured to estimate the blood pressure by applying a predefined blood pressure estimation model to a result of combining the CO feature and the TPR feature.

According to an aspect of the present disclosure, a method of estimating blood pressure, may include: measuring a bio-signal from an object; obtaining a cardiac output (CO) feature based on the bio-signal; determining a variation of the CO feature at a blood pressure measurement time relative to a calibration time; determining whether the variation of the CO feature is within a predetermined range; obtaining a total peripheral resistance (TPR) feature by combining an amplitude of a propagation wave component and amplitudes of at least two reflection wave components of the bio-signal, in response to the variation of the CO feature being within a predetermined range; obtaining the TPR feature by combining the amplitude of the propagation wave component and an amplitude of one reflection wave component of the at least two reflection wave components; and estimating blood pressure based on the CO feature and the TPR feature.

The CO feature may include at least one of a heart rate or a ratio between an amplitude at a predetermined point of the bio-signal and an area under a waveform of the bio-signal.

The predetermined point may include a point at which a slope of the waveform of the bio-signal may be closest to 0 in a systolic period.

The obtaining of the TPR feature may include: in response to the variation of the CO feature being within the predetermined range, linearly combining a first amplitude of a first reflection wave component and a second amplitude of a second reflection wave component, among the at least two reflection wave components, to obtain a combination result, and obtaining a ratio between the combination result and the amplitude of the propagation wave component as the TPR feature.

The obtaining of the TPR feature may include applying a predetermined weight to the second reflection wave component and linearly combining the second reflection wave component with the first reflection wave component.

The obtaining of the TPR feature may include obtaining a ratio between the amplitude of the one reflection wave component and the amplitude of the propagation wave component as the TPR feature in response to the variation of the CO feature not being within the predetermined range.

The obtaining of the variation of the CO feature may include obtaining the variation of the CO feature by dividing a value of the CO feature by a value of a reference CO feature at the calibration time.

The method may further include: obtaining a second-order differential signal of the bio-signal; extracting a first point of the propagation wave component and a second point of the reflection wave component by searching for a local minimum point of the second-order differential signal; and obtaining the TPR feature by combining the amplitude of the propagation wave component at the first point and the amplitude of the reflection wave component at the second point.

The estimating of the blood pressure may include estimating the blood pressure by applying a predefined blood pressure estimation model to a result of combining the CO feature and the TPR feature.

According to another aspect of the present disclosure, an electronic device may include: a main body; a photoplethysmogram (PPG) sensor disposed on one surface of the main body and configured to measure a PPG signal from an object; and a processor configured to: obtain a cardiac output (CO) feature based on the PPG signal; obtain a total peripheral resistance (TPR) feature by combining an amplitude of a propagation wave component and amplitudes of at least two reflection wave components of the PPG signal, in response to a variation of the CO feature at a blood pressure measurement time relative to a calibration time, being within a predetermined range; obtain the TPR feature by combining the amplitude of the propagation wave component and an amplitude of one reflection wave component of the at least two reflection wave components, in response to the variation of the CO feature not being within the predetermined range; and estimate blood pressure based on the CO feature and the TPR feature.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
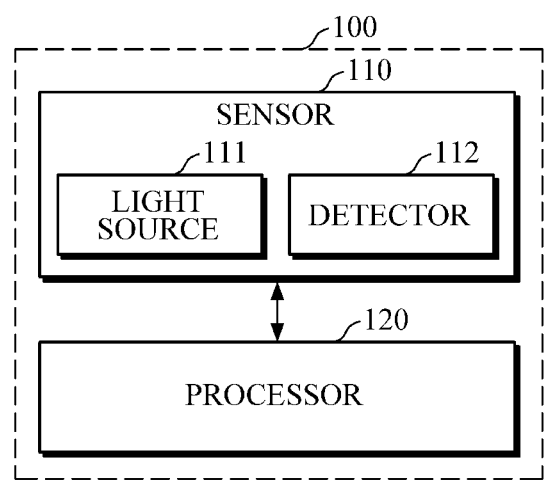
FIG. 1 is a block diagram illustrating an apparatus for estimating blood pressure according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. In the specification, unless explicitly described to the contrary, the word "comprise" and variations such as "comprises" or "comprising," will be understood to imply the inclusion of stated elements but not the exclusion of any other elements. Terms such as "unit" and "module" denote units that process at least one function or operation, and they may be implemented by using hardware, software, or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram illustrating an apparatus for estimating blood pressure according to an example embodiment.

Referring to FIG. 1, an apparatus 100 for estimating blood pressure includes a sensor 110 and a processor 120.

The sensor 110 acquires a bio-signal from an object and transmits the acquired bio-signal to the processor 120. In this case, the bio-signal may include various types of bio-signals, such as a photoplethysmogram (PPG) signal, an electrocardiography (ECG) signal, an electromyography (EMG) signal, and the like, which can be modeled by a plurality of waveform components. The sensor 110 may include a PPG sensor, an ECG sensor, and an EMG sensor to estimate blood pressure of a human body by analyzing a form of a pulse wave signal that reflects a cardiovascular state.

The PPG sensor may measure a PPG signal, and may include a light source 111 configured to emit light to an object and a detector configured to detect the light that is returned after being scattered, reflected, or transmitted through a biological tissue of the object. The light source 111 may be formed as a single light source, a plurality of light sources, or an array of light sources, and each light source may consist of light emitting diodes (LED), laser diodes, phosphors, and the like. A plurality of light sources may be configured to emit light of different wavelengths, e.g., red wavelengths, green wavelengths, blue wavelengths, infrared wavelengths, and the like, and the light is not particularly limited. The plurality of light sources may be driven sequentially in a time-division manner or simultaneously. The detector 112 may include a photodiode, a photo transistor, an image sensor (e.g., a complementary metal-oxide semiconductor (CMOS)), a spectrometer, and the like. The detector 112 may be formed as a single detector, a plurality of detectors, or an array of detectors.

The sensor 110 may measure a bio-signal from the object under the control of the processor 120. The sensor 110 may measure a bio-signal continuously for a predetermined period of time during which the user who brings the object into contact with the sensor 110 gradually increases/decreases a pressing force. The object may be a body part which may come into contact with the sensor 110, and from which pulse waves can be easily measured. For example, the object may be a region of a wrist surface adjacent to the radial artery which is an upper area of the wrist through which capillary blood or venous blood passes. In the case of measuring pulse waves on a position of the wrist over the radial artery, there may be relatively less external factors, such as the thickness of the skin tissue of the wrist, which may cause measurement errors. The radial artery is known to be a position where blood pressure may be measured more accurately than other arteries. However, the object is not limited thereto, and may be distal body portions, such as fingers and toes, which have a high density of blood vessels.

A force sensor for measuring a change in force applied to the sensor 110 by the object may be disposed at an upper end or lower end of the sensor 110. Here, the force sensor may be a pressure sensor, and the force measured by the force sensor may also be pressure.

Upon receiving a request for estimating blood pressure from the user or an external device, the processor 120 may control the sensor 110. When the force sensor measures the force of the object pressing the sensor 110, the processor 120 may guide the user to apply appropriate pressure on the basis of the measured force.

The processor 120 may be electrically or operatively connected to the sensor 110, and may control the sensor 110 to acquire a bio-signal. Upon receiving the bio-signal from the sensor 110, the processor 120 may perform preprocessing on the received bio-signal, such as removing noise from the bio-signal, or the like. For example, the processor 120 may perform signal correction, such as filtering (e.g., bandpass filtering at 0.4 to 10 Hz), amplification of a bio-signal, conversion into a digital signal, smoothing, ensemble averaging of continuously measured bio-signals, etc. Also, the processor 120 may obtain a representative one-period bio-signal used for estimating blood pressure from a continuous bio-signal.

The processor 120 may estimate blood pressure through waveform analysis of the measured bio-signal. Hereinafter, the term "blood pressure" may refer to one or all of mean arterial pressure (MAP), diastolic blood pressure (DBP), and systolic blood pressure (SBP), unless it is specifically mentioned. The processor 120 may extract a feature associated with blood pressure from the received bio-signal, and estimate blood pressure using the extracted feature. However, bio-information to be measured is not limited to blood pressure, and additional bio-information, such as vascular age, arterial stiffness, aortic pressure waveform, stress index, fatigue level, and the like, may be estimated.

The amount of change in MAP is proportional to cardiac output (CO) and total peripheral resistance (TPR) as shown in Equation 1 below. Here, cardiac output may refer to the volume of blood pumped by the heart in one minute. As described above, the cardiac output may be the product of heart rate and stroke volume.

$$\Delta MAP = CO \times TPR \quad (1)$$

Herein, $\Delta MAP$ denotes a difference in MAP between the left ventricle and the right atrium, in which MAP of the right atrium is generally in a range of 3 mmHg to 5 mmHg, such that MAP of the right atrium is similar to MAP of the left ventricle or MAP of the upper arm. Under a condition where absolute actual CO and TPR values are known, MAP may be obtained from the aorta or the upper arm. However, it may be difficult to estimate absolute CO and TPR values based on a bio-signal. Under normal circumstances, blood pressure is regulated within the normal range. For example, when blood pressure is about to rise due to a rapid increase in cardiac output, the diameter of blood vessels relaxes so that the TPR may decrease, which may allow blood pressure to return to normal.

The processor 120 may extract a feature associated with CO (hereinafter referred to as a "CO feature") and a feature associated with a TPR (hereafter referred to as a "TPR feature") from the bio-signal and estimate blood pressure using the CO feature and the TPR feature. For example, the processor 120 may analyze the bio-signal, a differential signal (e.g., a first order differential signal or a second-order differential signal) of the bio-signal, or the like to acquire a plurality of characteristic points, and may acquire the CO feature and/or the TPR feature by appropriately combining one or two or more of the acquired characteristic points. Here, the CO feature may be a feature value that shows a tendency of increasing or decreasing proportionally to CO when the CO is relatively increased or decreased by greater than a threshold as compared to the TPR that is substantially constant as compared to a stable state. The TPR feature may be a feature value that shows a tendency of increasing or decreasing proportionally to TPR when the TPR is relatively increased or decreased by greater than a threshold as compared to the CO that is substantially constant as compared to a stable state.

FIGS. 2A to 2F are diagrams for explaining example embodiments of obtaining blood pressure-associated features.

Figure 2A:
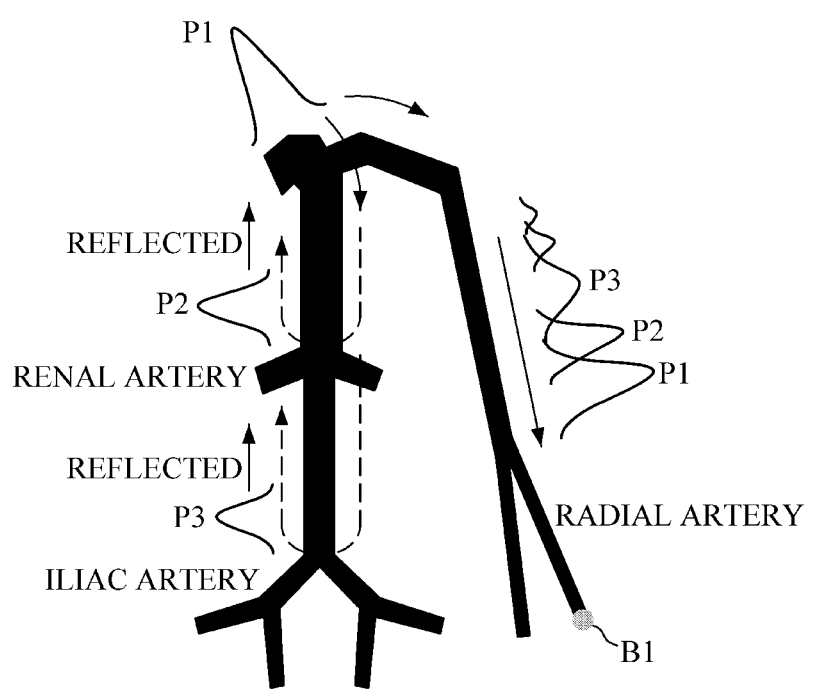
FIGS. 2A to 2F are diagrams for explaining example embodiments of obtaining blood pressure-associated features.
Figure 2B:
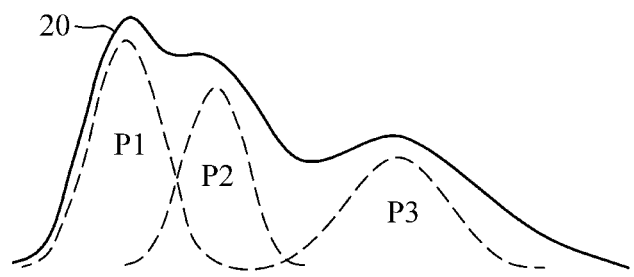

Referring to FIGS. 2A and 2B, a pulse wave signal 20 is generally formed by superposition of a propagation wave P1, which moves from the heart to the distal end of the body or branching points in the blood vessels by blood ejection from the left ventricle, and reflection waves P2 and P3 which return from the distal end of the body or the branching points of the blood vessels. For example, as illustrated in FIGS. 2A and 2B, the propagation wave P1 which is generated by blood ejection from the left ventricle may be mainly reflected from the renal arteries and the iliac arteries to generate, respectively, a first reflection wave P2 and a second reflection wave P3. In particular, the propagation wave P1 may be related to heart characteristics and the reflection waves P2 and P3 may be related to vascular characteristics. Accordingly, the CO feature and/or the TPR feature may be extracted based on time associated with each of the constituent pulse waveforms P1, P2, and P3 constituting the waveform of the pulse wave signal 20 and/or the amplitude of the pulse wave signal, and blood pressure may be measured by combining the extracted CO feature and TPR feature.

Figure 2C:
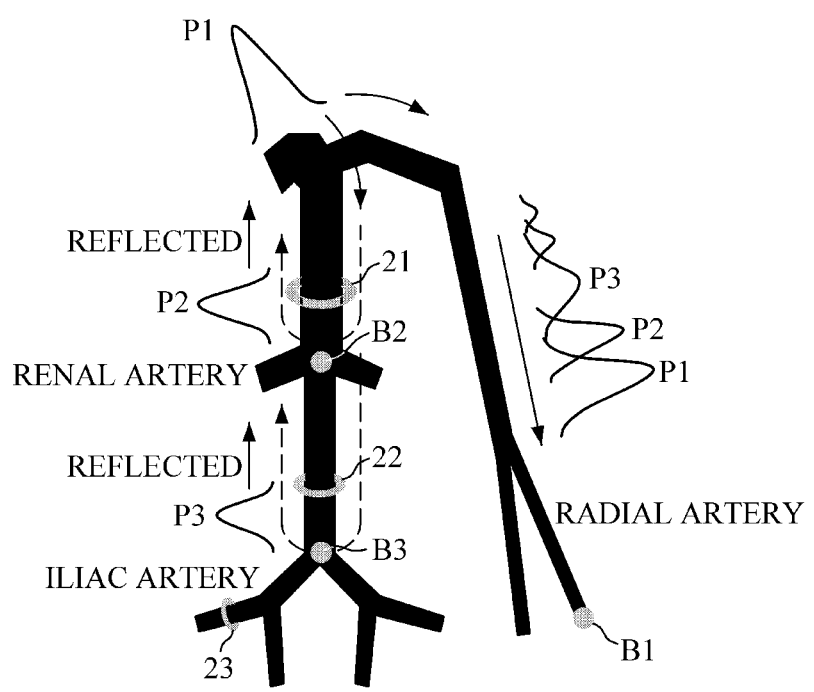
Figure 2D:
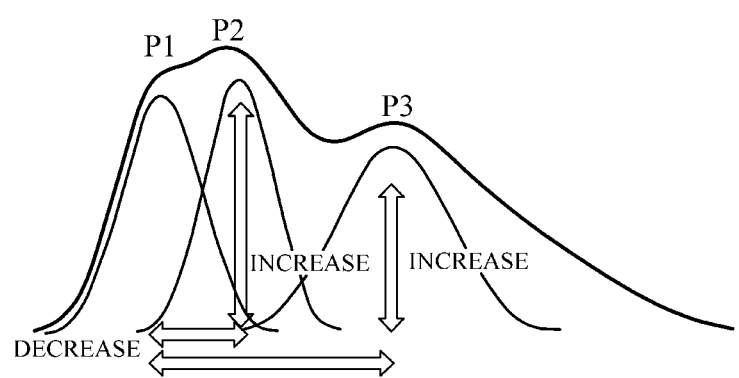

In general, when CO of the human body increases or the TPR increases, blood pressure rises. Referring to FIGS. 2C and 2D, as vascular resistance increases, a diameter difference 21 between a radial artery B1 and a renal artery B2, a diameter difference 22 between the renal artery B2 and the iliac artery B3, and a diameter difference 23 between the iliac artery B3 and another radial artery may decrease. As such, when the diameter difference increases, reflection coefficients in the renal artery B2 and the iliac artery B3 are increased, and accordingly, the magnitude of the reflection waves returning from the renal artery B2 and the iliac artery B3 may also be increased. In the present embodiment, considering the above-described fact, the TPR feature associated with the vascular resistance may be adaptively extracted.

Figure 2E:
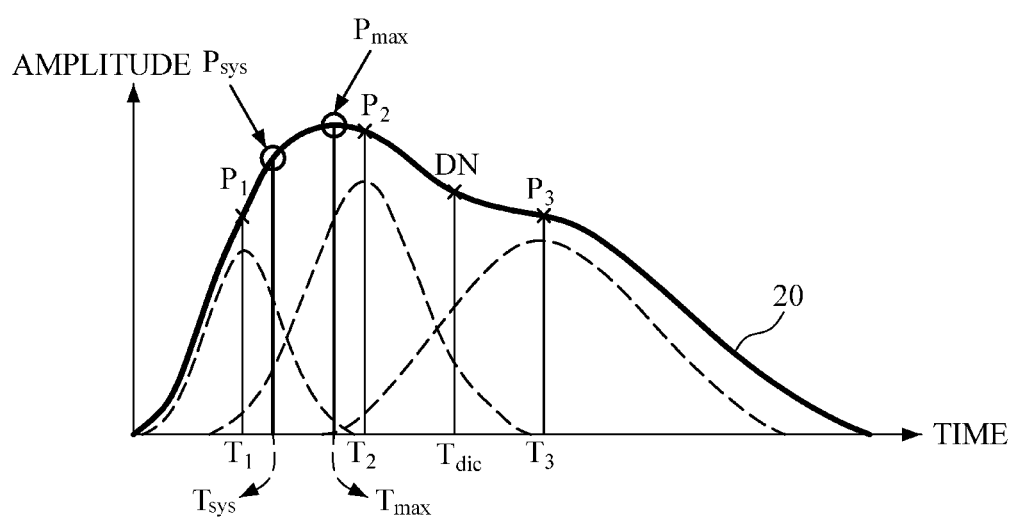
Figure 2F:
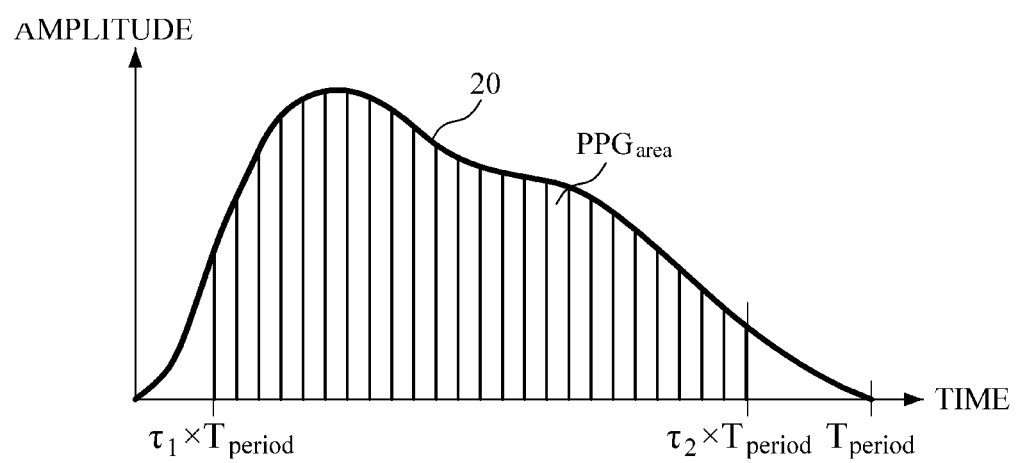

FIGS. 2E and 2F are graphs illustrating various characteristic points obtainable from a bio-signal. The characteristic points illustrated herein are merely examples and thus the embodiment is not limited thereto.

For example, the processor 120 may extract heart rate HR as a characteristic point from the bio-signal 20. Also, referring to FIG. 2E, the processor 120 may extract, from the bio-signal 20, time $T_1$ and/or amplitude $P_1$ associated with the propagation wave component, times $T_2$ and $T_3$ and/or amplitudes $P_2$ and $P_3$ associated with the reflection wave components as characteristic points. In particular, the processor 120 may derive a second-order differential signal of the bio-signal, and search for local minimum points of the second-order differential signal to extract the first, second, and third local minimum points as times $T_1$, $T_2$, and $T_3$ of the propagation wave component, a first reflection wave component, and a second reflection wave component, respectively.

In addition, the processor 120 may extract, as characteristic points, time Tmax and/or amplitude $P_{max}$ at a position where an amplitude has a maximum value (hereinafter, referred to as a "maximum amplitude position") in a systolic period (e.g., a period from a start point to the dicrotic notch (DN) point $T_{dic}$). In particular, the maximum amplitude position may mean a position at which the slope of the waveform of the bio-signal is closest to 0 in the systolic period. The processor 120 may derive the first differential signal of the bio-signal 20, and may extract a position at which the slope is closes to 0 by using the first differential signal.

Also, time $T_{sys}$ and/or amplitude $P_{sys}$ at a predetermined position, for example, in the middle of the position of the propagation wave component and the maximum amplitude position or at a position obtained by internally dividing the position of the propagation wave component and the maximum amplitude position by a predetermined ratio, may be extracted as characteristic points. In addition, referring to FIG. 2F, the area $PPG_{area}$ under the waveform of the bio-signal 20 may be extracted as a characteristic point. Here, the area $PPG_{area}$ under the waveform may be the area of a portion determined based on the one period time $T_{period}$ of the bio-signal 20 and arbitrary values $\tau_1$ and $\tau_2$ as illustrated in FIG. 2F. In this manner, the area under the entire waveform of the bio-signal 20, the area of a partial period, for example, the area of the systolic period, the area of the diastolic period, and the like, may be extracted by controlling the arbitrary values $\tau_1$ and $\tau_2$.

When the characteristic points are extracted, the processor 120 may acquire the CO feature and the TPR feature using the extracted characteristic points. For example, heart rate HR, $PPG_{area}$, $P3/P_{max}$, $P3/P_{sys}$, $P_{mx}/PPG_{area}$, $1/(T_3-T_1)$, $1/(T_3-T_{sys})$, $1/(T_3-T_{max})$, $1/(T_2-T_1)$, $P_2/P_1$, $P_3/P_{max}$, $P_3/P_1$, $(P_2+wP_3)/P_1$, and the like may be used as feature candidates, and the CO feature and the TPR feature may be extracted from among the feature candidates. In particular, the processor 120 may first extract the CO feature using the bio-signal, and may adaptively determine the TPR feature based on the change in the CO feature compared to the time of calibration.

For example, the processor 120 may acquire heart rate HR, or a ratio of the amplitude of the maximum amplitude position to the area under the waveform, as the CO feature. Also, the processor 120 may acquire, for example, a ratio of the amplitude of the reflection wave component to the amplitude of the propagation wave component as the TPR feature. In particular, the processor 120 may obtain a variation of the CO feature obtained at the time of estimating blood pressure, relative to the CO feature obtained at the time of calibration, and may obtain the TPR feature based on whether the variation of the CO feature satisfies a predetermined condition.

For example, as illustrated in Equation 2 below, the amplitude P2 of the first reflection wave component and the amplitude P3 of the third reflection wave component may be combined in the period during which the variation of the CO feature is relatively small, and a ratio between the combination result and the amplitude P1 of the propagation wave component may be obtained as the TPR feature fTPR1. On the contrary, in the remaining period, a ratio between the amplitude P2 of the first reflection wave component and the amplitude P1 of the propagation wave component may be obtained as the TPR feature fTPR2. Here, the variation of the CO feature may mean a rate of change fCOmea/fCOcal obtained by dividing the CO feature fCOmea obtained at the time of estimating blood pressure by the CO feature fCOcal obtained at the time of calibration. However, the present disclosure is not limited thereto. The variation may mean a value fCOmea/fCOcal−1 obtained by normalizing a result obtained by subtracting 1 from the rate of change, or a variation fCOmea−fCOcal obtained by subtracting the CO feature fCOcal obtained at the time of calibration from the CO feature fCOmea obtained at the time of estimating blood pressure.

$$fTPR1 = \frac{P2 + wP3}{P1} \quad (2)$$

$$fTPR2 = \frac{P2}{P1}$$

Here, fTPR1 represents a TPR feature obtained when the rate of change fCOmea/fCOcal of the CO feature is within a predetermined period (r1<fCOmea/fCOcal<r2), and fTPR2 represents a TPR feature in the other period. Here, the predetermined period may be a period in which, for example, the rate of change of the CO feature is 20% compared to the time of calibration, and at this time, r1 and r2 may be set to 0.8 and 1.2, respectively. In addition, w represents a weight that reflects the amplitude P3 of the second reflection wave component, and may be set to a value less than 1 (e.g., 0.5) in order to apply a smaller weight compared to the amplitude P2 of the first reflection wave component r1, r2, and w may be fixed values that can be universally applied to a plurality of users, or values personalized in consideration of individual users' characteristics.

When the CO feature and the TPR feature are acquired, the processor 120 may estimate blood pressure using a blood pressure estimation model that defines the relationship between the acquired features and blood pressure. The blood pressure estimation model may be predefined in the form of a linear or non-linear function which defines the relationship between each of the CO feature and the TPR feature and blood pressure. The CO feature and the TPR feature may each be acquired for systolic blood pressure and diastolic blood pressure. In this way, systolic blood pressure and diastolic blood pressure may be individually estimated by using the CO feature and TPR feature acquired for each blood pressure.

When conditions for calibration are satisfied, the processor 120 may perform calibration to obtain reference information, such as CO feature, TPR feature, cuff blood pressure, blood pressure estimation model, etc. For example, the processor 120 may perform calibration first when there is no reference information necessary for blood pressure estimation, such as when the apparatus 100 is used for the first time to estimate blood pressure, or when the apparatus 100 is initialized. In another example, whether calibration is to be performed may be determined by analyzing a blood pressure estimation result. For example, once blood pressure estimation is complete, if the estimated blood pressure value is outside a normal range, the number of times that the estimated blood pressure value is outside a normal range is greater than or equal to a threshold, the number of times that the estimated blood pressure continues to fall outside a normal range, or a number of times that the estimated blood pressure value falls outside a normal range during a predetermined period of time is greater than or equal to a predetermined threshold, it may be determined that calibration is required. However, the present disclosure is not limited thereto, such that calibration may be performed at a calibration interval or upon a user's request.

When it is determined to perform calibration, the processor 120 may guide the user to perform calibration. For example, the processor 120 may guide the user to bring the object into contact with a measurement position of the sensor, or provide guidance on contact pressure. In addition, the processor 120 may control the sensor 110 to acquire a bio-signal, and may obtain the CO feature, TPR feature, and the like from the acquired bio-signal, as described above. Also, the processor 120 may receive baseline cuff blood pressure from an external device, for example, a cuff blood pressure monitor, by using a communication module included in the apparatus 100, or may receive baseline cuff blood pressure directly from the user by outputting a user interface to a display. Further, the processor 120 may update the blood pressure estimation model by using the acquired CO feature, TPR feature, and reference blood pressure.

Figure 3:
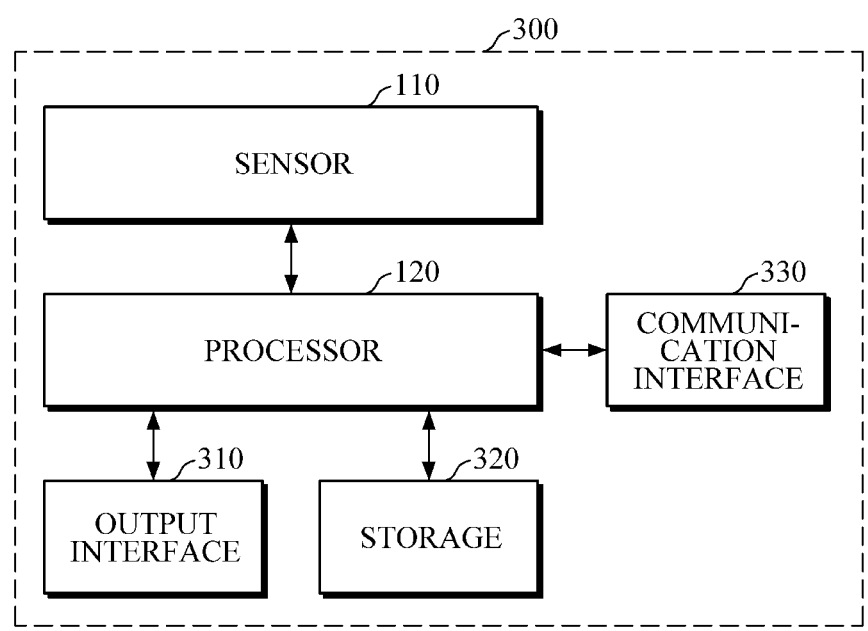
FIG. 3 is a block diagram illustrating an apparatus for estimating blood pressure according to another example embodiment.

FIG. 3 is a block diagram illustrating an apparatus for estimating blood pressure according to another example embodiment.

Referring to FIG. 3, an apparatus 300 for estimating blood pressure may include a sensor 110, a processor 120, an output interface 310, a storage 320, and a communication interface 330. The sensor 110 and the processor 120 are described above and hence detailed descriptions thereof will be omitted below.

The output interface 310 may output a bio-signal measured by the sensor 110 and/or data generated or processed by the processor 120 in a visual/non-visual manner. The output interface 310 may directly include a display device, a sound device, and a haptic device, or may interwork with a display device, a sound device, and a haptic device, which are mounted in an external device, through wired/wireless communication.

For example, when the user's blood pressure is estimated, the output interface 310 may output the blood pressure using various visual methods, such as a color, a thickness of a line, a font, and the like, based on whether the estimated blood pressure falls within or outside a normal range. Alternatively, the estimated blood pressure may be output by voice using a sound device, and may output a notification on whether the blood pressure is abnormal through vibration or tactile sensation by using a haptic device. In addition, the processor 120 may monitor a user's health status by analyzing a blood pressure estimation history. At this time, according to the monitoring result, the output interface 310 may warn or advise the user on actions to be taken by providing, for example, cautionary food information or information on a hospital to be reserved.

The storage 320 may store reference information acquired by the processor 120 through calibration. Also, the storage 320 may store a bio-signal acquired during blood pressure estimation, a CO feature, a TPR feature, an estimated blood pressure value, etc. In particular, the reference information may include, but is not limited to, user information, such as an age, gender, occupation, current health status, and the like, and/or a bio-signal obtained at the time of calibration, a CO feature, a TPR feature, baseline cuff blood pressure, a bio-information estimation model, and so on. The storage 320 may include at least one storage medium of a flash memory type memory, a hard disk type memory, a multimedia card micro type memory, a card type memory (e.g., an SD memory, an XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk, and the like.

The communication interface 330 may be connected to an external device to transmit and receive various types of data through communication technologies. For example, reference information related to blood pressure estimation may be received, and the bio-signal measured by the sensor 110 and the data (e.g., estimated blood pressure value) generated or processed by the processor 120 may be transmitted to the external device. The external device may include another apparatus for estimating blood pressure, a cuff-type blood pressure measurement device, a smart phone, a tablet personal computer (PC), a desktop PC, a notebook PC, etc., but is not limited thereto.

The communication technology is Bluetooth communication, Bluetooth Low Energy (BLE) communication, near field communication (NFC), WLAN communication, Zigbee communication, infrared (Infrared Data Association, IrDA) communication, WFD (Wi-Fi Direct) communication, ultra-wideband (UWB) communication, Ant+ communication, WIFI communication, Radio Frequency Identification (RFID) communication, third-generation (3G) communication, fourth-generation (4G) communication, fifth-generation (5G) communication and sixth-generation (6G) communication, including various wired and wireless communication technologies can be used to communicate with external devices. However, the present invention is not limited thereto.

Figure 4:
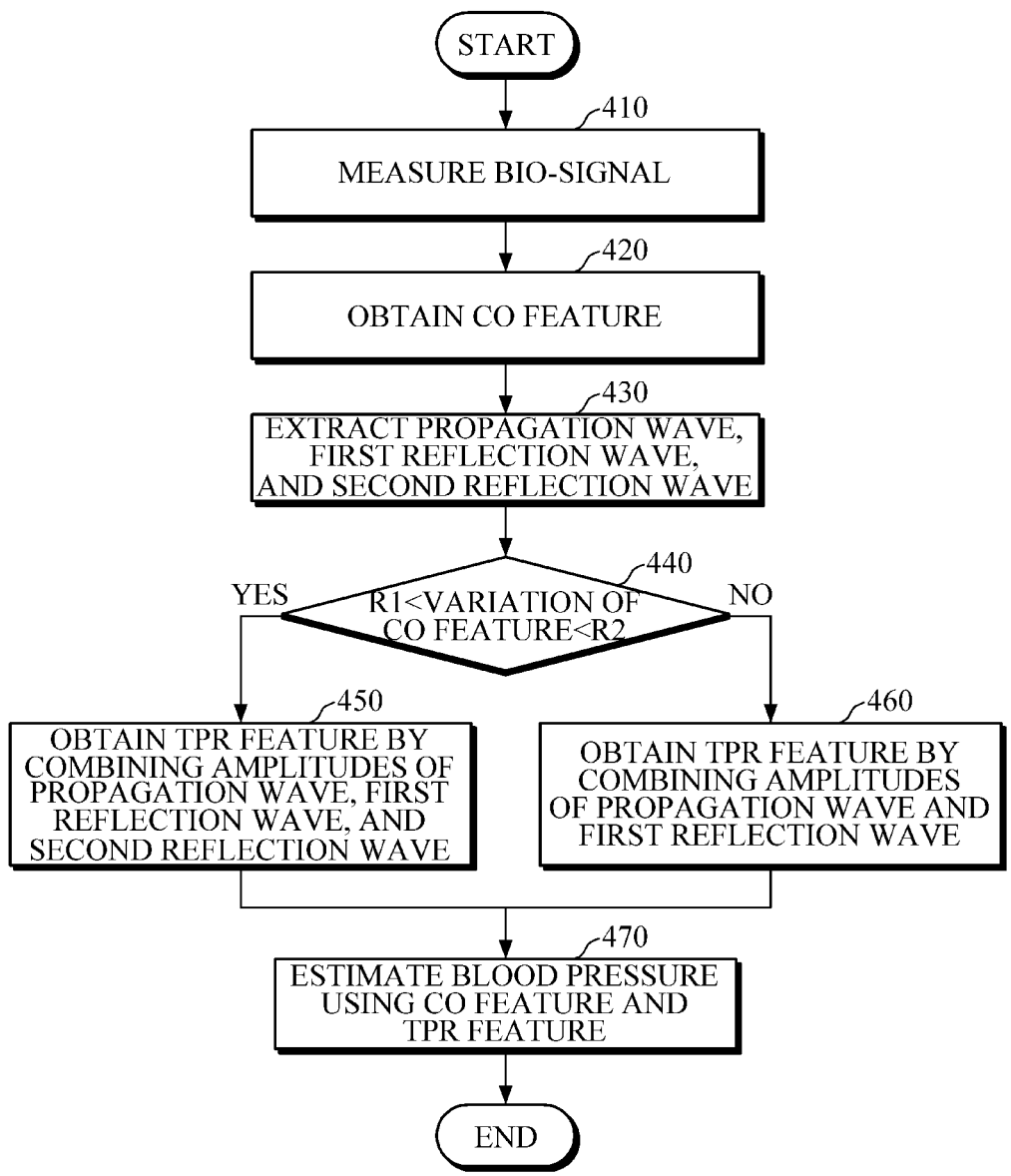
FIG. 4 is a flowchart illustrating a method of estimating blood pressure according to an example embodiment.

FIG. 4 is a flowchart illustrating a method of estimating blood pressure according to an example embodiment.

The method illustrated in FIG. 4 may be one example of a blood pressure estimation method performed by the apparatuses 100 and 300 described above, and thus the method will be described in brief to avoid unnecessary repetition.

First, the apparatuses 100 and 300 for estimating blood pressure may estimate a bio-signal from an object of a user upon receiving a request for estimating blood pressure in operation 410. The apparatuses 100 and 300 may receive a user's request for estimating blood pressure from an external device through a user interface, or may drive a light source of a sensor to emit light to the object and detect light scattered or reflected from the object using a detector to measure a bio-signal when a preset period has elapsed.

Then, a CO feature may be acquired using the bio-signal in operation 420. For example, heart rate, or a ratio between the maximum amplitude of a systolic period and the area under the waveform of the bio-signal, may be acquired as a CO feature.

Next, a propagation wave component, a first reflection wave component, and a second reflection wave component may be extracted using the bio-signal in operation 430. In particular, a second-order differential signal of the bio-signal may be derived, and local minimum points of the second-order differential signal may be searched for to extract the first, second, and third local minimum points as the propagation wave component, the first reflection wave component, and the second reflection wave component, respectively.

Then, whether a variation of the CO feature obtained in operation 420 falls within a predefined range may be determined in operation 440. Here, the variation of the CO feature may mean a rate of change obtained by dividing a value of the CO feature obtained in operation 420 by a value of a CO feature obtained at the time of calibration. However, the present disclosure is not limited thereto. The variation may mean a value obtained by normalizing a result obtained by subtracting 1 from the rate of change, or a variation obtained by subtracting the value of the CO feature obtained at the time of calibration from the value of the CO feature obtained in operation 420. Here, the lower limit r1 and the upper limit r2 of the range may be predefined.

Then, in operation 450, when the variation of the CO feature is within a predetermined range, a TPR feature may be obtained by combining the amplitudes of the propagation wave component, the first reflection wave component, and the second reflection wave component extracted in operation 430. For example, the TPR feature may be obtained by linearly combining the amplitude of the first reflection wave component and the amplitude of the second reflection wave component and dividing the combination result by the propagation wave component. In particular, since the second reflection wave component is relatively more affected by the change in CO, a weight may be applied to appropriately adjust the application ratio of the second reflection wave component and the linear combination may be performed when the TPR feature is obtained.

In operation 460, if it is determined in operation 440 that the variation of the CO feature is not within the predetermined range, a TPR feature may be obtained by combining the amplitudes of the propagation wave component and the first reflection wave component that are extracted in operation 430. For example, the TPR feature may be obtained by dividing the amplitude of the first reflection wave component by the amplitude of the propagation wave component.

Then, blood pressure may be estimated by using the CO feature and the TPR feature in operation 470. In this case, the blood pressure may be estimated using a blood pressure estimation model that defines the relationship between the value obtained by combining the CO feature and the TPR feature and blood pressure. When the blood pressure estimation is complete, information on the estimated blood pressure, health status, warning, and actions to be taken may be provided to the user using various visual/non-visual methods.

In an example embodiment, the processor 120 may perform operations 420-470 in real time while the sensor 110 continuously measures the pulse wave signal from the user, in operation 410.

Figure 5:
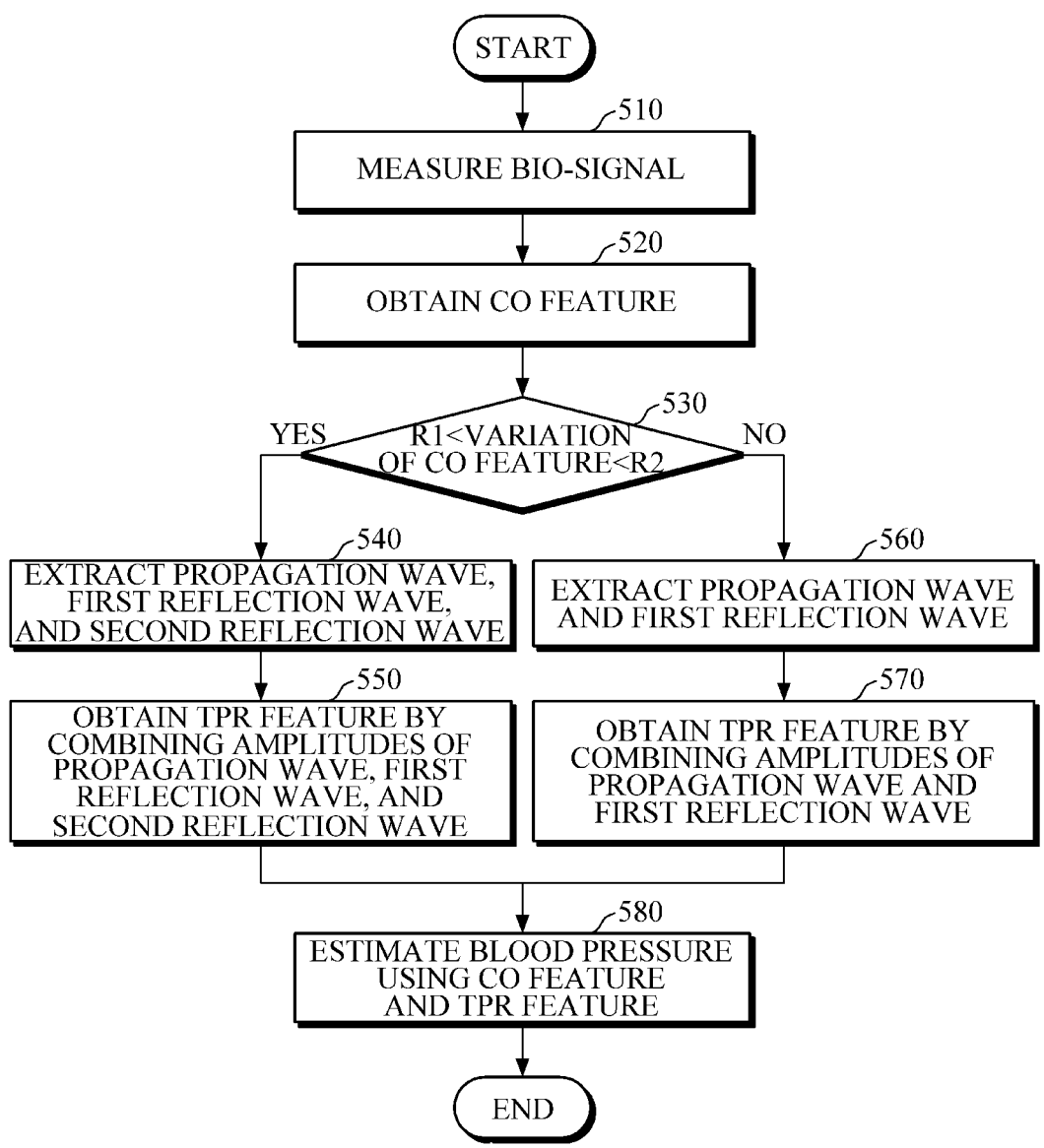
FIG. 5 is a flowchart illustrating a method of estimating blood pressure according to another example embodiment.

FIG. 5 is a flowchart illustrating a method of estimating blood pressure according to another example embodiment.

FIG. 5 is an example embodiment of a method for estimating blood pressure performed by the above-described blood pressure estimating apparatuses 100 and 300, which will be briefly described below in order to reduce redundancy.

First, the apparatuses 100 and 300 for estimating blood pressure may estimate a bio-signal from an object of a user upon receiving a request for estimating blood pressure in operation 510.

Then, a CO feature is obtained using the bio-signal in operation 520, and whether a variation of the obtained CO feature is within a predefined range.

Then, when the variation of the CO feature is within the predefined range from R1 to R2 in operation 530, a propagation wave component, a first reflection wave component, and a second reflection wave component may be extracted using the bio-signal in operation 540, and a TPR feature may be obtained in operation 550 by combining amplitudes of the extracted propagation wave component, first reflection wave component, and second reflection wave component. When the variation of the CO feature is not within the predefined range, a propagation wave component and a first reflection wave component may be extracted using the bio-signal in operation 560, and a TPR feature may be obtained in operation 570 by combining amplitudes of the extracted propagation wave component and first reflection wave component.

Then, blood pressure may be estimated using the CO feature and the TPR feature in operation 580.

Figure 6:
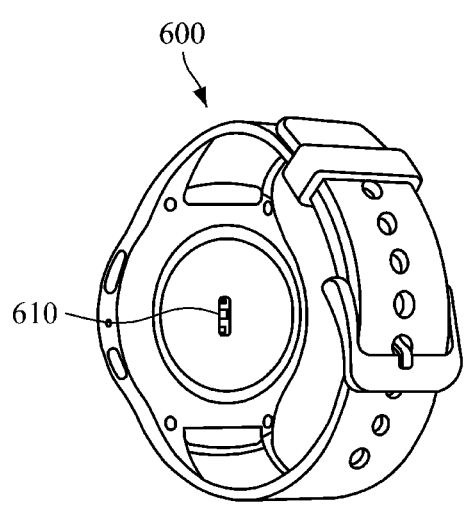
FIGS. 6 to 8 are diagrams illustrating various structures of an electronic device including an apparatus for estimating blood pressure.
Figure 7:
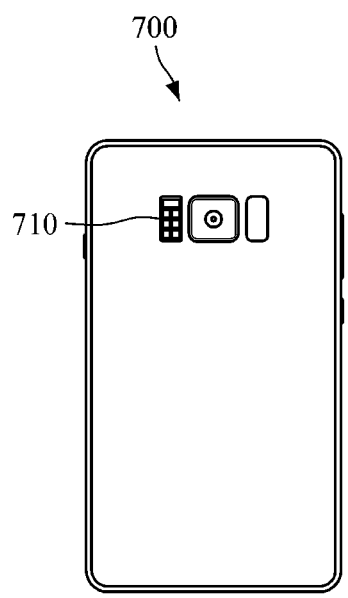
Figure 8:
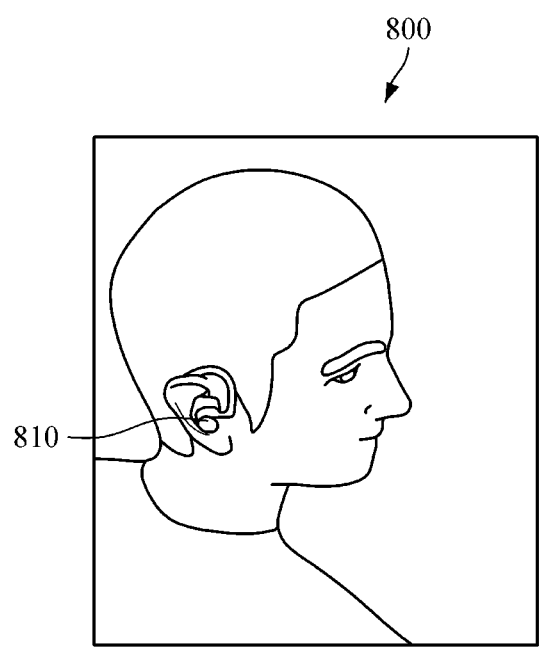

FIGS. 6 to 8 are diagrams illustrating various structures of an electronic device including the apparatus 100 or 300 for estimating blood pressure of FIG. 1 or 3.

The electronic device may include a wearable device, for example, a smart watch type, a smart band type, smart eyeglass type, a smart earphone type, a smart ring type, a smart patch, and a smart necklace type, a mobile device, such as a smartphone or a tablet PC, a home appliance, or various types of Internet of Things (IoT) device (e.g., home IoT device, etc.).

The electronic device may include a sensor module, a processor, an input device, a communication module, a camera module, an output device, a storage device, and a power module. The components of the electronic device may be integrally mounted in a specific device, or mounted in two or more devices in a distributed manner. The sensor device may include the sensor (e.g., PPG sensor) of the apparatus for estimating blood pressure 100 or 300, and may include additional sensors, such as a gyro sensor, a global positioning system (GPS), and the like.

The processor may control the components connected to the processor by executing a program or the like stored in the storage device, and may perform various data processing or operations. For example, a PPG signal may be measured from an object by using the PPG sensor of the sensor device, and blood pressure may be estimated using the measured PPG signal. Various embodiments of blood pressure estimation are described above, and hence detailed descriptions thereof will not be reiterated. The processor may include a main processor, such as a central processing unit and an application processor, and a co-processor that can be operated independently or together with the main processor, for example, a graphics processing unit, an image signal processor, a sensor hub processor, a communication processor, and the like.

The input device may receive a command and/or data to be used in each component of the electronic device from the user or the like. The input device may include a microphone, a mouse, a keyboard, and/or a digital pen (a stylus pen, etc.).

The communication module may support the establishment of a direct (cable) communication channel and/or wireless communication channel between the electronic device 900 and another electronic device or server in a network environment or the sensor module and the communication therebetween through the established communication channel. The communication module may be operated independently of the processor 920 and may include one or more communication processors that support direct communication and/or wireless communication. The communication module may include a wireless communication module, such as, a cellular communication module, a short-range wireless communication module, a global navigation satellite system (GNSS) communication module, or the like, and/or a wired communication module, such as a local area network (LAN) communication module, a power line communication module, or the like. Such various types of communication modules may be integrated into a single chip, or may be implemented as a plurality of separate chips. The wireless communication module may verify and authenticate the electronic device 700(?) in a communication network using subscriber information (e.g., international mobile subscriber identity (IMSI), or the like) stored in a subscriber identity module.

The camera module may capture still images and moving images. The camera module may include a lens assembly including one or more lenses, image sensors, image signal processors, and/or flashes. The lens assembly included in the camera module may collect light emitted from a subject to be imaged.

The output device may output data generated or processed by the electronic device (e.g., an estimated blood pressure value, health status, warning, actions to be taken, etc.) in a visual/non-visual manner. The output device may include a sound output device, a display device, an audio module, and/or a haptic module.

The sound output device may output a sound signal to the outside of the electronic device. The sound output device may include a speaker and/or a receiver. The speaker may be used for general purposes, such as multimedia playback or recording playback, and the receiver may be used to incoming calls. The receiver may be combined as part of the speaker or may be implemented as an independent separate device.

The display device may visually provide information to the outside of the electronic device. The display device may include a display, a hologram device, or a projector, and a control circuit for controlling the device. The display device may include touch circuitry set to sense touch and/or sensor circuitry (a pressure sensor, etc.) set to measure the intensity of force generated by the touch.

The audio module may convert sound into an electric signal or inversely convert an electric signal into sound. The audio module may obtain sound through the input device, and may output sound through the sound output device and/or a speaker and/or a headphone of another electronic device directly or wirelessly connected to the electronic device.

The haptic module may convert an electrical signal into a mechanical stimulus (e.g., a vibration or a movement) or electrical stimulus which may be recognized by a user via his tactile sensation or kinesthetic sensation. The haptic module may include a motor, a piezoelectric element, and/or an electric stimulator.

The storage device may store driving conditions required for driving the sensor module and various data required by other components of the electronic device, for example, software and input data and/or output data for commands related to the software. The storage device may include volatile memory and/or non-volatile memory.

The power module may manage power supplied to the electronic device. The power module may be configured as part of a power management integrated circuit (PMIC). The power module may include a battery and the battery may include a non-rechargeable primary cell, a rechargeable secondary cell, and/or a fuel cell.

Referring to FIG. 6, the electronic device may be configured as a watch-type wearable device 600 and may include a main body and a strap. A display may be provided on the front surface of the main body to display various application screens containing time information, received message information, blood pressure estimation, etc. A sensor device 610 may be disposed on a rear surface or a side surface of the main body.

Referring to FIG. 7, the electronic device may be implemented as a mobile device 700, such as a smartphone.

The mobile device 700 may include a housing and a display panel. The housing may form the outer appearance of the mobile device 700. The display panel and cover glass may be sequentially arranged on a first surface of the housing, and the display panel may be exposed to the outside through the cover glass. A sensor device 710, a camera module, and/or an infrared sensor may be disposed on a second surface of the housing. A processor and other various components may be disposed inside the housing.

Referring to FIG. 8, the electronic device may also be configured as an ear wearable device 800.

The ear wearable device 800 may include a main body and an ear strap. The user may wear the electronic device by wearing the ear strap on the auricle. The ear strap may be included according to the type of the wearable device 800. The main body may be inserted into the external auditory meatus of the user. The main body may be equipped with a sensor device 810. In addition, a processor may be disposed in the main body and may estimate blood pressure using a PPG signal measured by the sensor device 810. Alternatively, the ear wearable device 800 may estimate blood pressure in association with an external device. For example, the ear wearable device 800 may transmit a pulse wave signal measured by the sensor device 810 of the ear wearable device 800 to an external device, for example, a smartphone, a tablet PC, or the like, through a communication module provided inside the main body, so that a processor of the external device can measure blood pressure. Then, the ear wearable device 800 may output an estimated blood pressure value through a sound output module provided inside the main body of the ear wearable device 800.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing example embodiments are merely exemplary and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An apparatus for estimating blood pressure, the apparatus comprising:
   a sensor configured to measure a bio-signal from an object; and
   a processor configured to:
     receive, from a user via an input interface of the apparatus, an input;
     obtain a cardiac output (CO) feature based on the bio-signal;
     obtain a total peripheral resistance (TPR) feature by combining an amplitude of a propagation wave component and amplitudes of at least two reflection wave components of the bio-signal, in response to a variation of the CO feature at a blood pressure measurement time relative to a calibration time, being within a predetermined range;
     obtain the TPR feature by combining the amplitude of the propagation wave component and an amplitude of one reflection wave component of the at least two reflection wave components, in response to the variation of the CO feature not being within the predetermined range;
     estimate blood pressure based on the CO feature and the TPR feature, and
     provide the estimated blood pressure to the user via an output interface of the apparatus.

2. The apparatus of claim 1, wherein the CO feature comprises at least one of a heart rate or a ratio between an amplitude at a predetermined point of the bio-signal and an area under a waveform of the bio-signal.

3. The apparatus of claim 2, wherein the predetermined point comprises a point at which a slope of the waveform of the bio-signal is closest to 0 in a systolic period.

4. The apparatus of claim 1, wherein the processor is further configured to, in response to the variation of the CO feature being within the predetermined range:
   linearly combine an amplitude of a first reflection wave component and an amplitude of a second reflection wave component, among the at least two reflection wave components, to obtain a combination result; and
   obtain a ratio between the combination result and the amplitude of the propagation wave component as the TPR feature.

5. The apparatus of claim 4, wherein the processor is further configured to:
   apply a predetermined weight to the second reflection wave component; and
   linearly combine the second reflection wave component with the first reflection wave component.

6. The apparatus of claim 5, wherein the predetermined weight is a value less than 1.

7. The apparatus of claim 1, wherein the processor is further configured to obtain, as the TPR feature, a ratio between the amplitude of the one reflection wave component and the amplitude of the propagation wave component, in response to the variation of the CO feature not being within the predetermined range.

8. The apparatus of claim 1, wherein the processor is further configured to obtain the variation of the CO feature by dividing a value of the CO feature at the blood pressure measurement time by a value of a reference CO feature at the calibration time.

9. The apparatus of claim 1, wherein the processor is further configured to, in response to the variation of the CO feature not being within the predetermined range:
   obtain a second-order differential signal of the bio-signal;
   extract a first point of the propagation wave component and a second point of the one reflection wave component by searching for a local minimum point of the second-order differential signal; and
   obtain the TPR feature by combining the amplitude of the propagation wave component at the first point and the amplitude of the one reflection wave component at the second point.

10. The apparatus of claim 1, wherein the processor is further configured to estimate the blood pressure by applying a predefined blood pressure estimation model to a result of combining the CO feature and the TPR feature.

11. A method of estimating blood pressure by an apparatus, the method comprising:
   receiving, from a user via an input interface of the apparatus, an input;
   measuring a bio-signal from an object;
   obtaining a cardiac output (CO) feature based on the bio-signal;
   determining a variation of the CO feature at a blood pressure measurement time relative to a calibration time;
   determining whether the variation of the CO feature is within a predetermined range;
   obtaining a total peripheral resistance (TPR) feature by combining an amplitude of a propagation wave component and amplitudes of at least two reflection wave components of the bio-signal, in response to the variation of the CO feature being within the predetermined range;
   obtaining the TPR feature by combining the amplitude of the propagation wave component and an amplitude of one reflection wave component of the at least two reflection wave components, in response to the variation of the CO feature not being within the predetermined range;
   estimating blood pressure based on the CO feature and the TPR feature; and
   providing the estimated blood pressure to the user via an output interface of the apparatus.

12. The method of claim 11, wherein the CO feature comprises at least one of a heart rate or a ratio between an amplitude at a predetermined point of the bio-signal and an area under a waveform of the bio-signal.

13. The method of claim 12, wherein the predetermined point comprises a point at which a slope of the waveform of the bio-signal is closest to 0 in a systolic period.

14. The method of claim 11, wherein the obtaining of the TPR feature comprises:
  in response to the variation of the CO feature being within the predetermined range, linearly combining a first amplitude of a first reflection wave component and a second amplitude of a second reflection wave component, among the at least two reflection wave components, to obtain a combination result, and obtaining a ratio between the combination result and the amplitude of the propagation wave component as the TPR feature.

15. The method of claim 14, wherein the obtaining of the TPR feature comprises applying a predetermined weight to the second reflection wave component and linearly combining the second reflection wave component with the first reflection wave component.

16. The method of claim 11, wherein the obtaining of the TPR feature comprises obtaining a ratio between the amplitude of the one reflection wave component and the amplitude of the propagation wave component as the TPR feature in response to the variation of the CO feature not being within the predetermined range.

17. The method of claim 11, wherein the obtaining of the variation of the CO feature comprises obtaining the variation of the CO feature by dividing a value of the CO feature by a value of a reference CO feature at the calibration time.

18. The method of claim 11, further comprising:
  obtaining a second-order differential signal of the bio-signal;
  extracting a first point of the propagation wave component and a second point of the one reflection wave component by searching for a local minimum point of the second-order differential signal; and
  obtaining the TPR feature by combining the amplitude of the propagation wave component at the first point and the amplitude of the one reflection wave component at the second point.

19. The method of claim 11, wherein the estimating of the blood pressure comprises estimating the blood pressure by applying a predefined blood pressure estimation model to a result of combining the CO feature and the TPR feature.

20. An electronic device comprising:
  a main body;
  a photoplethysmogram (PPG) sensor disposed on one surface of the main body and configured to measure a PPG signal from an object; and
  a processor configured to:
    receive, from a user via an input interface of the electronic device, an input;
    obtain a cardiac output (CO) feature based on the PPG signal;
    obtain a total peripheral resistance (TPR) feature by combining an amplitude of a propagation wave component and amplitudes of at least two reflection wave components of the PPG signal, in response to a variation of the CO feature at a blood pressure measurement time relative to a calibration time, being within a predetermined range;
    obtain the TPR feature by combining the amplitude of the propagation wave component and an amplitude of one reflection wave component of the at least two reflection wave components, in response to the variation of the CO feature not being within the predetermined range;
    estimate blood pressure based on the CO feature and the TPR feature, and
    provide the estimated blood pressure to the user via an output interface of the electronic device.

* * * * *